US012348385B2

(12) United States Patent
Sharma

(10) Patent No.: US 12,348,385 B2
(45) Date of Patent: Jul. 1, 2025

(54) PRIORITIZING COMPUTER SYSTEM ISSUES

(71) Applicant: MICRO FOCUS LLC, Santa Clara, CA (US)

(72) Inventor: Arun Sharma, Bangalore (IN)

(73) Assignee: Micro Focus LLC, Santa Clara, CA (US)

(*) Notice: Subject to any disclaimer, the term of this patent is extended or adjusted under 35 U.S.C. 154(b) by 366 days.

(21) Appl. No.: 16/822,515

(22) Filed: Mar. 18, 2020

(65) Prior Publication Data
US 2020/0328950 A1 Oct. 15, 2020

(30) Foreign Application Priority Data
Apr. 11, 2019 (IN) .............................. 201941014736

(51) Int. Cl.
H04L 41/22 (2022.01)
G06F 3/04817 (2022.01)
G06F 16/2457 (2019.01)
G06F 21/55 (2013.01)
G06N 5/04 (2023.01)
G06N 20/00 (2019.01)
H04L 43/08 (2022.01)

(52) U.S. Cl.
CPC .......... H04L 41/22 (2013.01); G06F 3/04817 (2013.01); G06F 16/24578 (2019.01); G06F 21/552 (2013.01); G06N 5/04 (2013.01); G06N 20/00 (2019.01); H04L 43/08 (2013.01); G06F 2221/034 (2013.01)

(58) Field of Classification Search
CPC ......... H04L 41/22; H04L 43/08; G06N 20/00; G06N 5/04; G06F 16/24578; G06F 3/04817; G06F 21/552; G06F 2221/034
See application file for complete search history.

(56) References Cited

U.S. PATENT DOCUMENTS

| 10,019,302 | B2 | 7/2018 | Nguyen | |
|---|---|---|---|---|
| 2008/0028470 | A1 | 1/2008 | Remington | |
| 2011/0144777 | A1* | 6/2011 | Firkins | G05B 23/0272 700/83 |
| 2014/0229614 | A1* | 8/2014 | Aggarwal | H04L 41/5032 709/224 |
| 2014/0379895 | A1* | 12/2014 | Jain | H04L 41/0609 709/224 |
| 2015/0278024 | A1* | 10/2015 | Barman | H04L 67/61 707/634 |
| 2015/0304346 | A1 | 10/2015 | Kim | |

(Continued)

OTHER PUBLICATIONS

Fader, Peter et al.; "RFM and CLV: Using iso-value curves for customer base analysis." Journal of Marketing Research 42.4 (2005): 415-430.

(Continued)

Primary Examiner — Tony Wu
(74) Attorney, Agent, or Firm — Sheridan Ross P.C.

(57) ABSTRACT

A method includes determining, by a computer, measures of recency for a plurality of issues that are associated with a plurality of devices of a computer system; and determining, by the computer, measures of frequency for the plurality of issues. The method includes prioritizing, by the computer, the plurality of issues for review based on the determined measures of recency and frequency.

20 Claims, 8 Drawing Sheets

(56) References Cited

U.S. PATENT DOCUMENTS

| | | | |
|---|---|---|---|
| 2016/0154693 A1* | 6/2016 | Uhde | G06F 11/0709 |
| | | | 714/49 |
| 2018/0083988 A1 | 3/2018 | Kataoka | |
| 2018/0176237 A1 | 6/2018 | Freedman | |
| 2018/0336353 A1 | 11/2018 | Manadhata | |
| 2018/0349817 A1* | 12/2018 | Goel | G06Q 10/0635 |
| 2020/0029240 A1* | 1/2020 | Li | H04L 43/08 |
| 2020/0210590 A1* | 7/2020 | Doyle | G06N 20/00 |
| 2022/0156168 A1* | 5/2022 | Panikkar | G06F 11/277 |

OTHER PUBLICATIONS

Dong et al; GID: Graph-based Intrusion Detection on Massive Process Traces for Enterprise Security Systems; NEC Laboratores America, University of Washington; Aug. 8, 2016; 11pgs.

Kohavi et al; "Visualizing RFM Segmentation."; SDM; 2004; 5 pages.

RiskIQ Inc.; RiskIQ External Threats, Detect and Respond to Digital Threats; 2019; 2 pages.

* cited by examiner

PRIORITIZING COMPUTER SYSTEM ISSUES

BACKGROUND

Business organizations are ever increasingly dependent on high speed network-based communication for a wide variety of computer-related functions, such as accessing cloud computing resources, providing cloud computing resources, providing live stream, accessing financial information, performing multi-node distributed computing, performing multi-node database processing, performing multi-node computation-intensive processing, accessing Internet-based resources, providing business web portals, and so forth. High speed network communication relies on a reliable and well-maintained computer network. For this purpose, a business organization may have a suite of software products, tools and utilities to gather information about network devices and in response to this information, generate alerts about potential network-related issues. These alerts and information, which may be presented to information technology (IT) personnel through graphical user interface (GUI)-based dashboards, aid the IT personnel in identifying, assessing and resolving network issues.

DETAILED DESCRIPTION

Figure 1:
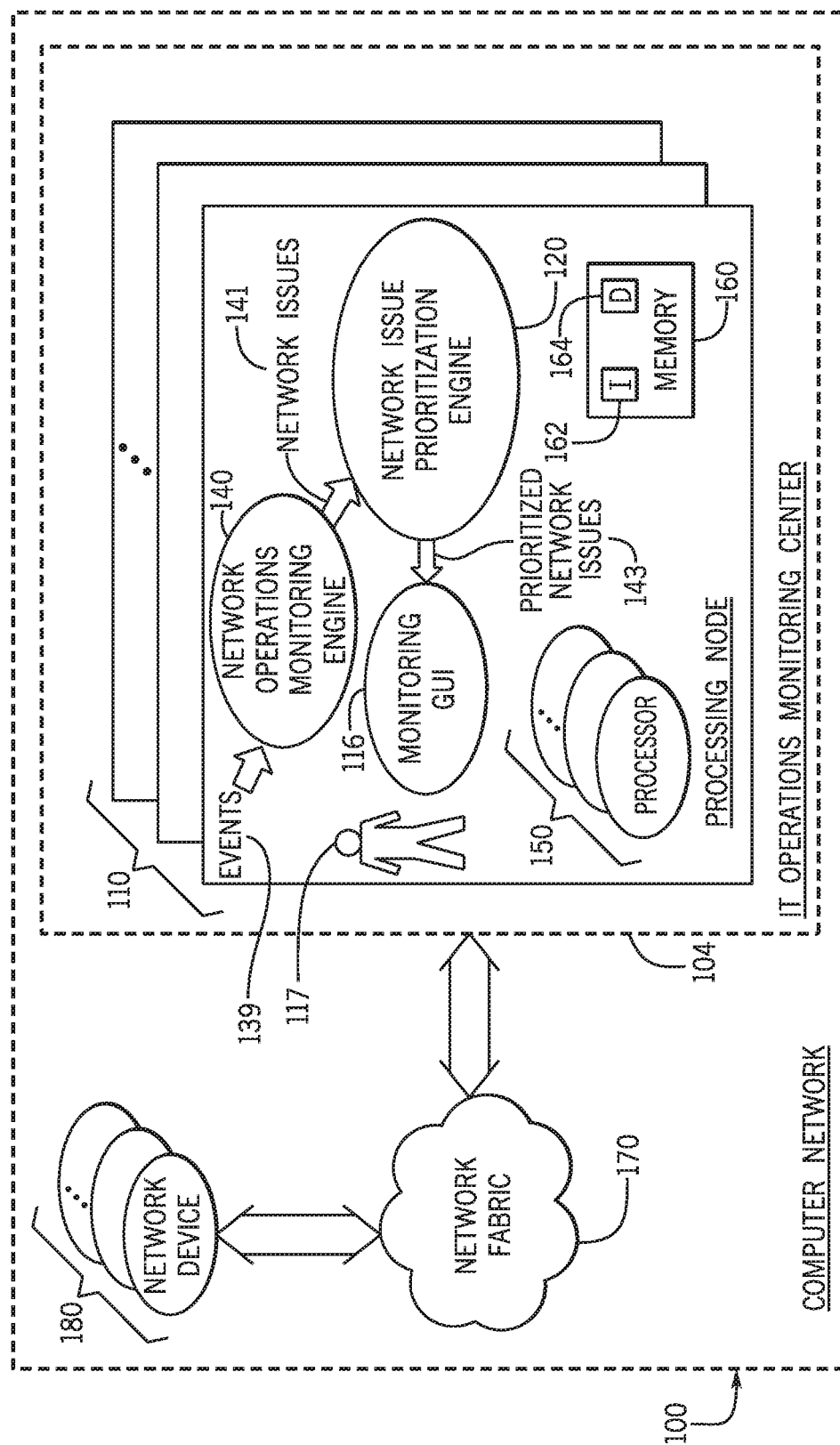
FIG. 1 is a schematic diagram of a computer system having a network issue prioritization engine according to an example implementation.

A business organization may have an information technology (IT) operations monitoring center in with a relatively large staff of human IT personnel (e.g., network engineers) monitor (GUI)-based dashboards for such purposes as monitoring the health of the organization's computer network, identifying potential issues (herein called "network issues") with network devices and addressing any such issues. In this context, a "network device" refers to any physical or virtual device that is connected to or part of the network fabric, such as computers, clients, servers, routers, switches, bridges, hub, firewalls, gateways, so and forth. The network issues may arise due to any of a wide variety of problems, such as misconfigured network devices, network devices having failed hardware, network devices having corrupted software, network devices being that have been or are being by malware, network devices having duplicate Internet Protocol (IP) addresses, network devices experiencing domain name service (DNS) issues, network devices having incorrect or incomplete firewall settings, network devices experiencing sharing problems, network devices having relatively slow bandwidths, network devices having relatively high latencies, network devices having high data error rates, and so forth. Moreover, a given network issue may be attributable to more than one problem with an associated network device, and a given network issue associated with a given network device may be attributable to a problem (misconfiguration, failure, malware infection, and so forth) occurring with another network device.

The IT operations center may have suite of network monitoring software, tools and utilities to, in response to events occurring in the computer network, generate alerts on the dashboards to bring the associated network issues to the attention of IT analysts for further evaluation. As examples, the network monitoring software may analyze event data associated with hypertext protocol (HTTP) logs, domain name service (DNS) logs, virtual private network (VPN) logs, switch logs, gateway logs, net flow traffic, and so forth. In general, the network monitoring software may analyze events arising from both hardware and software of the computer system, which may be potentially associated with network issues to be brought to the attention of the IT analysts.

For purposes of minimizing downtimes in network connectivity, maximizing application up times and minimizing the costs associated with owning and maintaining the computer network, the network monitoring should be relatively robust. This may be quite challenging, however, as the number of network issues that are brought to the attention of the IT analysts may be in the hundreds to thousands per day, or even more. Keeping up with such a large number of network issues may be challenging, even for a highly-staffed and highly-trained IT operations monitoring center.

In accordance with example implementations that are described herein, a network issue prioritization engine prioritizes network issues to assign the issues to priority classes (high, medium and low priority classes, for example) to allow IT analysts o focus on the more important network issues to ensure that these network issues are promptly investigated and resolved. In accordance with example implementations, the network issue prioritization engine prioritizes network issues by determining scores for the network issues that are based on observed recency metric values, observed frequency metric values and priorities that are assigned to the associated network devices.

More specifically, in accordance with example implementations, the network issue prioritization engine may calculate scores for a certain set of network issues as follows. This set of network issues may be, as an example, network issues that fall within a certain time window of the most recent network issues, which have not been marked (via the dashboard GUI) as being addressed by IT analysts. The network issue prioritization engine determines measures of recency and frequency for each network issue.

In accordance with example implementations, the "recency" measure for a network issue refers to a metric value (called the "R" recency metric value" herein) that quantifies the time that has elapsed since the network device that is associated with the issue presented the same issue. In accordance with example implementations, the R recency metric value is higher for a network issue that is frequently reoccurring in a network device, as compared a lower R recency metric value for a network issue that occur less frequently with the network device.

The network issue prioritization engine calculates the R recency metric value based on the number of time units that have elapsed between the last two times that the network device experienced the issue. In accordance with some implementations, the network issue prioritization engine may select the particular time unit (e.g., select whether the time unit is a millisecond, a second, an hour or a day) based on the criticality of the associated network device and/or the criticality of the business or business function that is affiliated with or supported by the associated network device. For example, for network devices that support live streaming or financial applications, the network issue prioritization engine may set the time unit for calculating the R recency metric value for associated network issues to be a millisecond or a second, as compared to, for example, a time unit of an hour or day for network issues that are associated with network devices that perform batch jobs over weekends, which run per week.

In accordance with example implementations, the "frequency" measure for a network issue refers to a metric value (called the "F frequency metric value" herein) that represents the total number of network issues that are associated with a network device during a period of time. The predefined period of time may be based on the criticality of the network device or the criticality of a business function that is affiliated with or supported by the network device. As examples, the predefined period may be a period of milliseconds, seconds, hours or days. Therefore, in accordance with example implementations, for a given network issue that is associated with a particular network device, the network issue prioritization engine determines the number of times that the network device has experienced this network issued, determines a time period based on a criticality that is associated with the network device, and then determines the F frequency metric value as being the number of times divided by the time period. In accordance with example implementations, an F frequency metric value is higher for a network issue that occurs more frequently for an associated network device, as compared to an F frequency value metric value for a network issue that occurs less frequently for an associated network device.

Another component that the network issue prioritization engine may consider in determining a score for a network issued is a priority value (called the "P priority value" herein) of the associated network device. The priority may be, as an example, a pre-defined criticality number or, in accordance with further example implementations, a relative unit ranking among other network devices that are managing a particular application. For example, network devices running, continuous (i.e., 24 hours per day, seven days per week) up time applications, may be assign relatively high priorities versus, for example, network devices that are generally in standby modes for maintenance activities or are being used for batch jobs once per day. In accordance with example implementations, a P priority value is higher for a network issue that is associated with a more critical network device, as compared to a P priority value that is lower for a network issue that is associated with a relatively less critical network device.

Thus, in accordance with example implementations, the network issue prioritization engine determines, for each network issue within a given time window (a sliding time window for example) of network issues, the following values that are associated with the network issue: an R recency metric value, an F frequency metric value and a P priority value.

After the calculation of these values for a given network issue, the network issue prioritization engine may then, based on the values, assign the network issue to levels, or tiers, of an R recency metric group, an F frequency metric group and a P priority value group. In accordance with example implementations, the network issue prioritization engine assigns all of the network issues within the time window to each of the three groups and then ranks the network issue within each group. More specifically, the network issue prioritization engine ranks the network issues of the R recency metric value group based on their R recency metric value (e.g., ranks the network issues in a descending order according to the R recency metric values); ranks the network issues of the F frequency metric value group based on their F frequency metric value values (e.g., ranks the network issues in a descending order according to the F frequency metric values), and ranks the network issues of the P priority value group based on their P priority values (e.g.; ranks the network issues in a descending order according to the P priority values).

Therefore, each network issue has an associated R recency metric value-based ranking, an F frequency metric value-based ranking and a P priority value-based ranking. In accordance with example implementations, the network issue prioritization engine assigns, or determines, a score for the network issue based on these three rankings; and based on the determined scores, the network issue prioritization engine, in accordance with example implementations, assigns a priority classification to the network issue, such as, for example, a priority classification of "high," "medium," or "low," depending on whether the score falls into a first value range associated with the high category, a second lower value range associated with the medium category, or the lowest value range that is associated with the low category. The network issue prioritization engine may assign the network issues to priority classifications based on the scores using other methodologies and may assign the network issues to fewer than three or more than three classifications, in accordance with further implementations.

Referring to FIG. 1, as a more specific example, in accordance with some implementations, a computer network 100 (i.e., a "computer system"), such as a computer network of an enterprise, may include network devices 180. In general, a "network device 180" refers to any device (host computer, client, server, tablet, a thin client, a rack-mounted computer, a cluster of computing nodes, a router, a bridge, a gateway device, and so forth), which may either be part of network fabric 170 or use the network fabric 170 to communicate with other network devices 180 of the computer system. Moreover, a particular network device 180 may be an actual physical machine or a virtual device (a virtual switch of a software defined network (SDN), for example) that is hosted on an actual, physical machine.

In general, the computer network 100 may be any type of computer network, such as a public cloud-based computer system, a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

In general, the network fabric 170 may include components and use protocols that are associated with any type of communication network and/or multiple types of communication networks, such as (as examples) Fibre Channel networks, iSCSI networks, ATA over Ethernet (AoE) networks, HyperSCSI networks, local area networks (LANs), wide area networks (WANs), wireless networks, global networks (e.g., the Internet), or any combination thereof.

In accordance with example implementations, one or multiple network operations monitoring engines 140 of the computer network 100 may, in an automated manner, monitor system events 139 (e.g. monitor, in real-time in near real-time, logged data, communication streams, and so forth) and generate corresponding alerts for network issues 141 to be reviewed by human IT analysts 117 (e.g., software engineers). The IT analysts 117 may use processor-based tools for purposes of performing a "network issue triage" to investigate the network issues 141 for such purposes as validating the network issues 141, assessing the nature and severities of the network issues 141, determining corrective actions to take to resolve network issues 141, initiating corrective actions to resolve or mitigate the network issues 141, and so forth. For example, an IT analyst 117 may use a monitoring graphical user interface (GUI) 116 (i.e., an investigative dashboard) to review a given incoming network issue 141 that is displayed on the GUI 116, and possibly use investigative tools of the GUI 116 to determine whether the given network issue 141 should be deemed severe enough to escalate the issue 141 to be addressed. As further described herein, to aid the security alert triage, the computer network 100 includes a network issue prioritization engine 120 to provide data representing prioritized network issues 143 so that the IT analysts 117 may select (via input) reports on the GUI 116 that display network issues that have certain selected priorities (network issues 141 that have critical priorities, for example).

As depicted in FIG. 1, in accordance with example implementations, the computer network 100 may include one or multiple processing nodes 110, and one or multiple of these processing nodes 110 may contain one or multiple network operations monitoring engines 140 that analyze event data of the computer network 100, such as hypertext protocol (HTTP) logs, domain name service (DNS) logs, virtual private network (VPN) logs, net flow traffic, router logs, communication flows, network communication metrics, and so forth, for purposes of identifying network issues 141 and generating corresponding alerts. The processing node 110 may further include one or multiple graphical user interfaces (GUIs), such as the monitoring GUIs 116.

In accordance with example implementations, a given processing node 110 may include a network issue prioritization engine 120, that determines, for each network issue 141 within a given time window (a sliding time window for example) the following values for the issue 141; an R recency metric value, an F frequency metric value and a P priority value. The network issue prioritization engine 20 assigns the network issues 141 to an R recency metric group, an F frequency metric group and a P priority value group; ranks the network issues of the R recency metric value group based on their R recency metric value (e.g., ranks the network issues in a descending order according to the R recency metric values); ranks the network issues of the F frequency metric value group based on their F frequency metric value values (e.g., ranks the network issues in a descending order according to the F frequency metric values), and ranks the network issues of the P priority value group based on their P priority values (e.g., ranks the network issues in a descending order according to the P priority values). Based on these rankings, the network issue prioritization engine 120 determines a score for each of the network issues 141; and the network issue prioritization engine 120 assigns a priority classification to each network issue 141 based on its calculated score.

In accordance with example implementations, the processing node 110 may include one or multiple physical hardware processors 150, such as one or multiple central processing units (CPUs), one or multiple CPU cores, and so forth. Moreover, the processing node 110 may include a local memory 160. In general, the local memory 160 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 160 may store various data 164 (data representing features of network issues 141 that are processed by the network issue prioritization engine 120, data representing features or characteristics of network devices 180 that are associated with the network issues 114, R recency metric values, F frequency metric values, P priority values, assigned time units for the R recency metric value calculations, assigned time periods for the F frequency metric value calculations, identifications of business critical functions, associations of network devices to business functions, determined network issue scores, determined network issue priority classifications, parameters and/or variables used by the network issue prioritization engine 120, and so forth). The memory 160 may store machine executable instructions 162 (i.e., software) that, when executed by the processor(s) 150, cause the processor(s) 150 to form one or multiple components of the processing node 110, such as, for example, the network issue prioritization engine 120, the investigation GUI 116, the security alert engine 140, and so forth.

In accordance with some implementations, each processing node 110 may include one or multiple personal computers, workstations, servers, rack-mounted computers, special purpose computers, and so forth. Depending on the particular implementations, the processing nodes 110 may be located at the same geographical location or may be located at multiple geographical locations. Moreover, in accordance with some implementations, multiple processing nodes 110 may be rack-mounted computers, such that sets of the processing nodes 110 may be installed in the same rack. In accordance with further example implementations, the processing nodes 110 may be associated with one or multiple virtual machines that are hosted by one or multiple physical machines.

In accordance with some implementations, the processor 150 may be a hardware circuit that does not execute machine executable instructions. For example, in accordance with some implementations, the network issue prioritization engine 120 may be formed in whole or in part by an application specific integrated circuit (ASIC), a field programmable gate array (FPGA), and so forth. Thus, many implementations are contemplated, which are within the scope of the appended claims.

Figure 2:
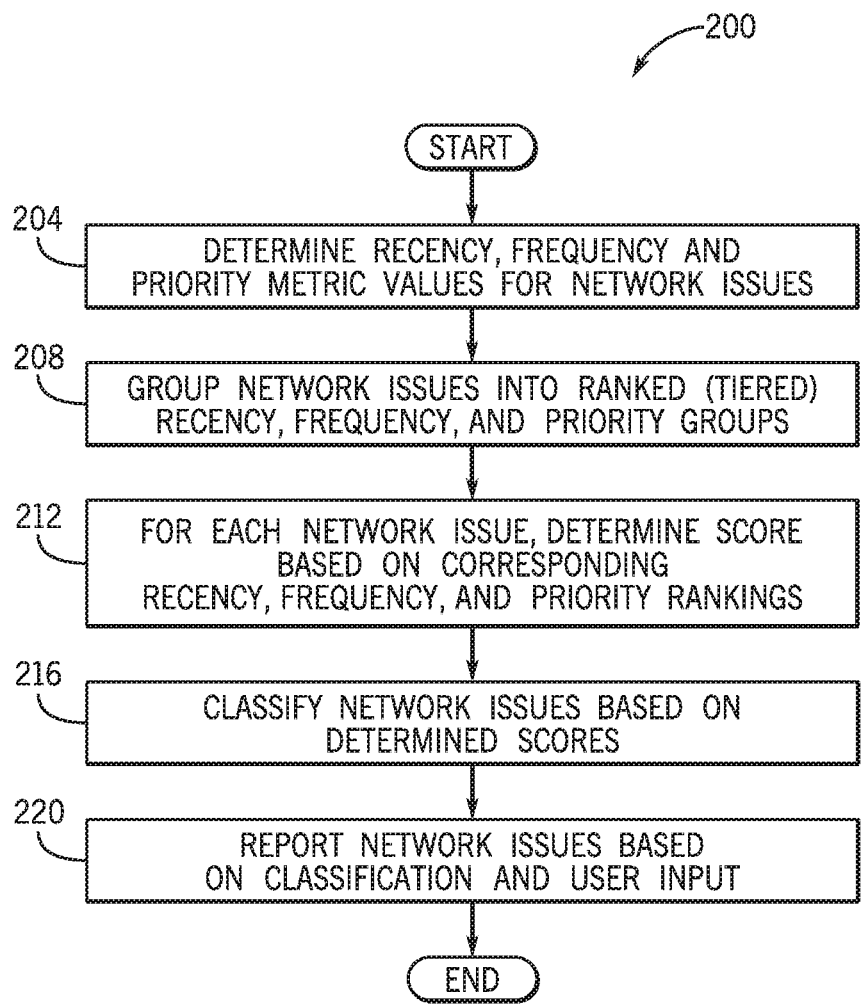
FIG. 2 is a flow diagram depicting a process to classify and report network issues that occur in a computer system according to an example implementation.

As a more specific example, in accordance with some implementations, the network issue prioritization engine 120 may perform a process 200 that is illustrated in FIG. 2. Referring to FIG. 2 in conjunction with FIG. 1, pursuant to the process 200, for a given set of network issues (network issues or alerts occurring within a predefined period or sliding time window, for example), the network issue prioritization engine 120 determines (block 204) R metric values, F frequency metric values and P priority values for the network issues. Based on these determined values, the network issue prioritization engine 120 groups (block 208) the network issues into ranked, or tiered, R recency, F frequency and P priority groups. For example, in accordance with some implementations, each group may contain three different ranks, or tiers, as illustrated below in Table 1:

TABLE 1

| Recency (R) | Frequency (F) | Priority (P) |
|---|---|---|
| R-Tier-1 (Most Recent) | F-Tier-1 (Most Frequent) | P-Tier-1 (Highest Priority) |
| R-Tier 2 | F-Tier-2 | P-Tier-2 |
| R-Tier-3 (Least Recent) | F-Tier-3 (Hardly any Issues) | P-Tier-3 (Lowest Priority) |

For the example depicted in Table 1, there are 27 distinct network issues segments (i.e., 27 different possible permutations), Based on its rankings in these three groups, the network issue prioritization engine 120 determines a score for each network issue, pursuant to block 212.

For example, in accordance with some implementations, the determined score may be a concatenation of the tiers, or rankings, from all three groups. As more specific examples, if a given network issue is the first (the uppermost) tier of each group, then the network issue prioritization engine 120 assigns a score of "1-1-1" to the network issue; and if a given network issue is the second tier of the R recency group, in the first tier of the F frequency group and in the second tier of the P priority group, then the network issue prioritization engine 120 assigns a score of "2-1-2" to the network issue.

Table 2 below depicts example scores and the inferences that may be drawn from the scores:

TABLE 2

| Score | What Does it Mean? | Inference |
|---|---|---|
| 1-1-1 | R-Tier-1 (Have Recent Issues), F-Tier-1 (Quite frequent issues in defined duration) & P-Tier-1 (High Priority Devices) | Showstopper issues and need immediate attention. |
| 2-2-1 | R-Tier-2 (Quite Recent Issues), F-Tier-2 (Quite high frequency of issues in defined duration) & P-Tier-1 (High priority devices) | Devices need additional maintenance support to run without issues. |

TABLE 2-continued

| Score | What Does it Mean? | Inference |
|---|---|---|
| 3-3-1 | R-Tier-3 (Almost no recent issues), F-Tier-3 (Not high frequency of issues in defined duration) & P-Tier-1 (High priority devices) | Devices are working as intended and do not have any issues recently. Situation is in control for these devices. |
| 3-3-3 | R-Tier-3 (Almost no recent issues), F-Tier-3 (Low frequency of issues in defined duration) & P-Tier-3 (Low priority devices) | If the issues come from these devices, analyst can hold them for additional time as they are running low priority applications & the issues are also not very frequent. |
| 1-1-3 | R-Tier-1 (Have recent issues), F-Tier-1 (Quite frequency issues in defined duration) & P-Tier-3 (Low priority devices) | Quite frequency issues from these devices but no major impact. Maybe, it is time to stop using these devices to avoid noise in the system & plan for migration to other devices in a staged manner. |

In a similar manner, the other 22 score permutations result in corresponding inferences.

The network issue prioritization engine 120 classifies (block 216) the network issues based on the determined scores. This classification may involve the network issue prioritization engine 120 assigning priorities to the network issues based on associated determined scores for these issues. Moreover, the scores for the network issues may be tiered, so that, for example, a score within a first range corresponds to a first network issue priority, a score within a second range corresponds to a second network issue priority, and so forth. For the example that is set forth above in Table 2 above, the network issue prioritization engine 120 may assign the network issue that has the associated determined score of "1-1-1" to have a priority of "1" (i.e., the highest, or most important priority; assign the network issue that has the associated determined score of "2-2-1" to have a priority of "1"; assign the network issue that has the associated determined score of "3-3-1" to have a priority of "1"; assign the network issue that has the associated determined score of "3-3-3" to have a priority of "5"; assign the network issue that has the associated determined score of "1-1-3" to have a priority of "2."

Pursuant to block 220 of FIG. 2, the network issue prioritization engine 120 may report network issues (e.g., display a corresponding report, such as a chart or graph on the GUI 116) based on the above-described classifications and on user input. For example, an IT analyst 117 may, through inputs that are provided to the GUI 116 (e.g., mouse clicks, keyboard entered text into a dialog box, and so forth) select network issues that have certain priorities.

As a more specific example, Using the above-described scoring, the network issue prioritization engine 120 may generate the following report (via a displayed graphic on the GUI 116, for example):

TABLE 3

| Issue ID | Device IP | System Location | Hostname | RFP-Based Score | Recency | Freq. | Priority |
|---|---|---|---|---|---|---|---|
| 1 | 16.172.10.5 | North LIT lab n-3140 | nortel5510.ftc.hpeswlab.net | 111 (Most Critical) | 1539657713 | 10 | 1 |
| 2 | 16.172.10.8 | LSPO North lab | lspo12ar.hpeswlab.net | 221 | 1530657713 | 5 | 1 |
| 3 | 15.112.11.9 | Olympia Lab 6th 2130 | nombtplx21.hpeswlab.net | 331 | 1538857713 | 6 | 1 |
| 4 | 15.112.11.10 | Olympia Lab 6th 2130 | Nombtplx11.hpeswlab.net | 333 (Least Critical) | 1539157713 | 3 | 5 |

TABLE 3-continued

| Issue ID | Device IP | System Location | Hostname | RFP-Based Score | Recency | Freq. | Priority |
|---|---|---|---|---|---|---|---|
| 5 | 16.172.10.5 | LSPO North lab | Lspo112ar.hpeswlab.net | 113 | 1539957713 | 1 | 2 |
| 6 | 15.112.11.20 | Olympia Lab 6th 2130 | Nombtplx01.hpeswlab.net | 333 | 1529657713 | 35 | 5 |
| 7 | 15.112.11.51 | Olympia Lab 6th 2130 | Nombtplx91.hpeswlab.net | 113 | 1569657713 | 6 | 2 |

The analyst 117 may provide input to the GUI 116 to select a report, for example, that displays priority one network issues, and accordingly, the GUI may display a report containing the first three rows of Table 3.

Figure 3:
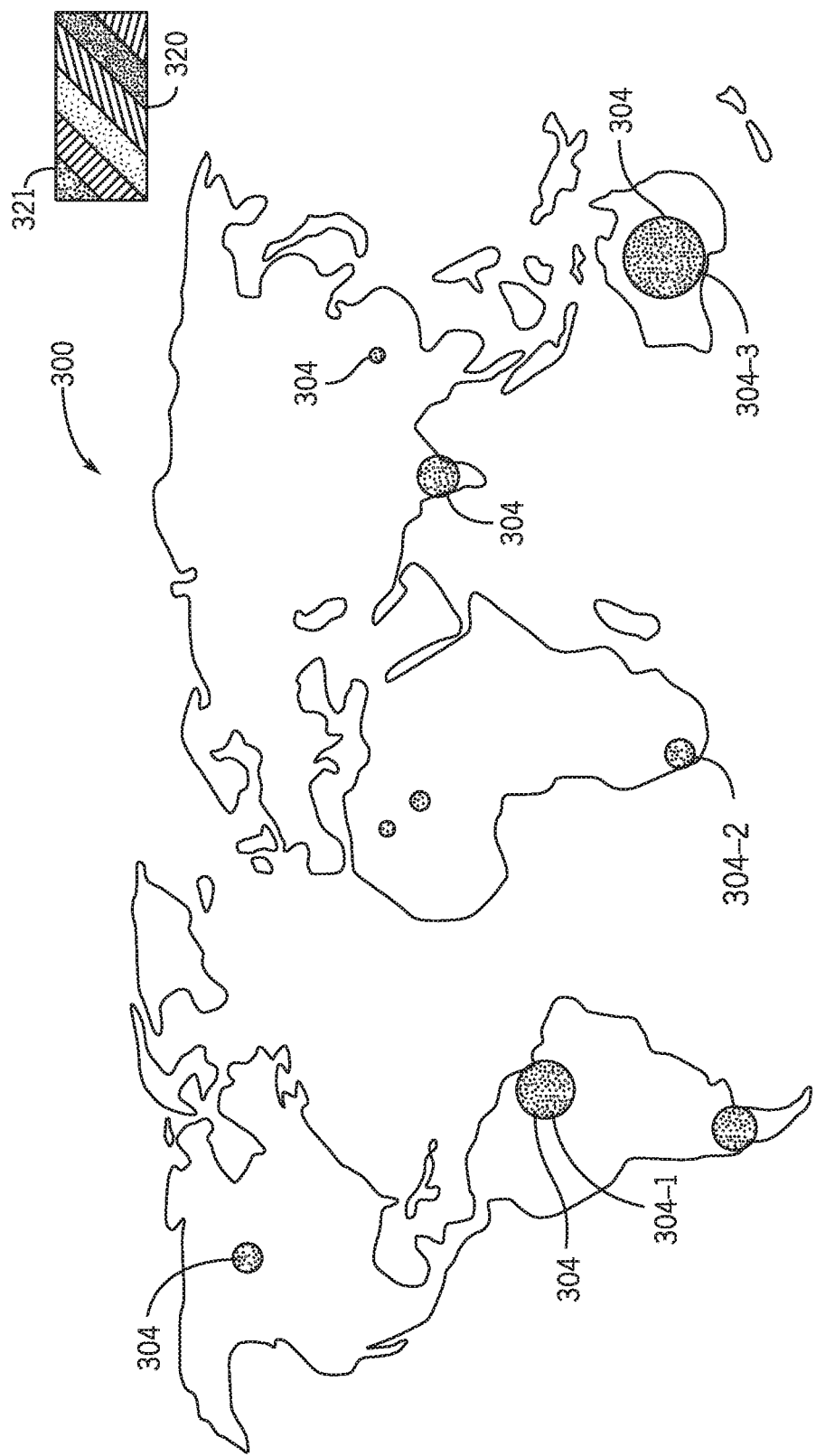
FIG. 3 is an illustration of a graphical user interface (GUI)-based political map displaying network issues associated with a selected priority classification at corresponding geographical locations according to an example implementation.

In accordance with further example implementations, the network issue prioritization engine 120 may display a report in the form of a political map on the GUI 116, such as example political map 300 that is depicted in FIG. 3. Referring to FIG. 3 in conjunction with FIG. 1, for this example, the political map 300 is a world map having indicators 304 (dots or filled circles, for example) that are associated with network issues and are depicted at geographical locations at which the associated network issues have occurred. For example, the map 300 may display indicators 304 (dots, for example) for critical network issues (e.g., network issues that each have a priority of "1" for example), and the relative sizes (diameters, for example) of the indicators 304 may indicate, or represent, the corresponding number of critical network issues at a particular location. For example, the indicators 304-1, 304-2 and 304-3 may correspond to critical network issues that occur at datacenter locations in Brazil, South Africa and Australia, respectively. For this example, a relatively larger number of critical network issues have occurred at the datacenter in Australia, as compared to, for example, the datacenter in South Africa. The ability for the It analyst 117 to view the geographic distribution of critical security events allows the security analyst 117 to glean information pertaining to geographically-related problems with network devices.

In accordance with some implementations, the GUI 116 may display a color legend 320, which associates a particular color to an issue priority. For example, in accordance with some implementations, the issue priorities may correspond to the color spectrum from red 321 (the most critical and corresponding to the indicators 304 that are displayed in the map 300 of FIG. 3) to green (the least critical). By viewing the legend 320, the IT analyst 117 may correspondingly readily identify the issue priorities that are displayed on the map 300. Moreover, in accordance with further example implementations, the legend 320 may serve as an input, for the analyst 117 to select (click on, for example) a particular color to cause the GUI 116 to correspondingly display a report of network issues having the selected priority. Moreover, in accordance with further example implementations, the map 300 may display indicators 304 for more than one priority (display using green and yellow colors, for example), depending on the input provided by the analyst 117. In accordance with yet further example implementations, the map 300 may contain other features to highlight critical issues, such as, for example, displaying a halo around a particular location. Thus, many implementations are contemplated, which are within the scope of the appended claims.

Although, for the examples described above, the network issue prioritization engine 120 determines scores by applying equal weights to the tiers of the R recency, F frequency and P priority, in accordance with further example implementations, the network issue prioritization engine 120 may apply different weights to these tiers for purposes of determining the scores. Moreover, the weighting may be selected by, for example, configuration options that are provided by the IT analyst 117 via the GUI 116. For example, in accordance with some implementations, the IT analyst 117 may assign weights in a non-uniform manner for purposes of determining the score, such as, for example, a weight of "1.5" to the F frequency metric value, and weights of "1" to each of the R recency metric value and P priority value.

In accordance with further example implementations, the network issue prioritization engine 120 may contain a supervised machine learning engine for purposes of identifying network devices 180 that are likely to have future associated network issues. For example, the supervised machine engine may predict network devices 180, which need immediate attention to allow actions to be taken in advance to prevent the future issues with the devices 180. In accordance with example implementations, the supervised machine learning engine performs classification and may any type of classification-based machine learning algorithm, such as a decision tree algorithm, a k nearest neighbor (KNN) algorithm, a support vector machine (SVM)-based algorithm, naive Bayes-based algorithm, and so forth.

Figure 4:
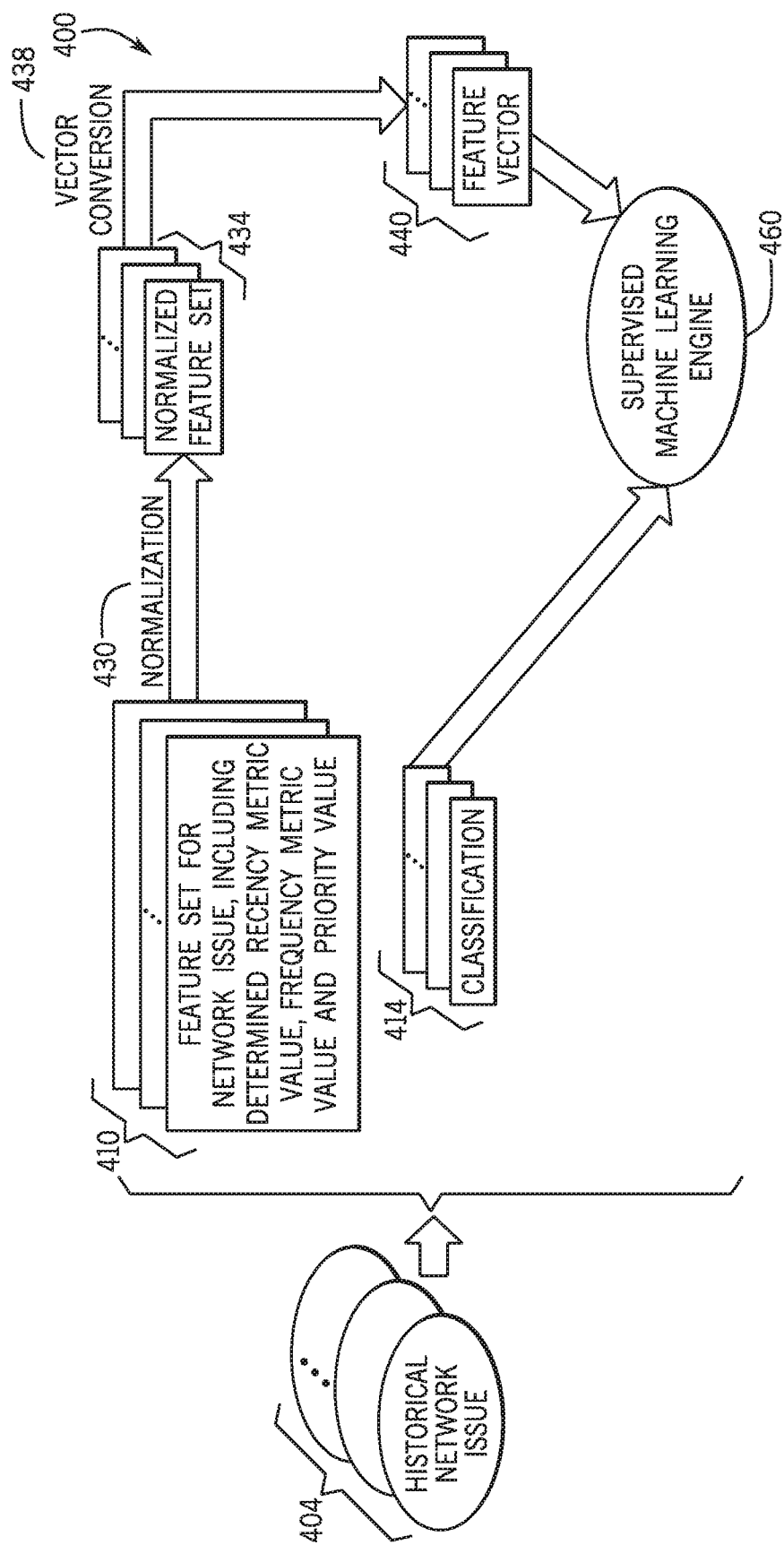
FIG. 4 is an illustration of a process to train a supervised machine learning engine to identify network devices likely to have future issues according to an example implementation.

As a more specific example, FIG. 4 depicts a process 400 to train a supervised machine learning engine 460, which may be, for example, part of the network issue prioritization engine 120. In general, the supervised machine learning engine 460 may be trained by observing features of observed historical network issues 404 and their corresponding classifications 414. In this manner, a given historical network issue 404 has a corresponding feature set 410, including an R recency metric value, an F frequency metric value, a P priority value, and possibly other features (the determined score for the network issue, and so forth). The historical network issue 404 is labeled, in that a determination was made regarding whether network issue 404 was indicative of the associated network device having a future network issue. A historical network issue 404, in the context of this application, refers to any network issue on which the supervised machine learning engine 460 is trained, including network issues used to initially train the supervised machine learning engine 460 before the engine 460 was put in service, as well as network issues for which the supervised machine learning engine 460 has predicted network devices with future network issues and which were "labeled" by the actions that were taken by the IT analysts 117 (e.g., whether corrective action was taken, whether the prediction was validated, whether the prediction was invalidated) and possibly whether the network devices actually had future network issues.

Referring to FIG. 4 in conjunction with FIG. 1, in accordance with example implementations, the network issue prioritization engine 120 processes the features sets 410 to perform a normalization 430 to produce a corresponding normalized feature set 434 for each feature set 410. The network issue prioritization engine 120 may further apply a vector conversion 438 to the normalized feature sets 434 to produce corresponding feature vectors 440. As an example, each feature vector 440 may be an M dimensional tuple, where each dimension value represents the presence of the feature (a value other than "0" for example) and a weight (for a nonzero value) for the feature. The supervised machine learning engine 460 is trained to classify feature vectors that correspond to unclassified network issues (e.g., assign a classification of "associated network device needs attention to prevent future network issues" or "associated network device does not need attention to prevent future network issues") based on the feature vectors 440 and the associated labels, or classifications 414.

Figure 5:
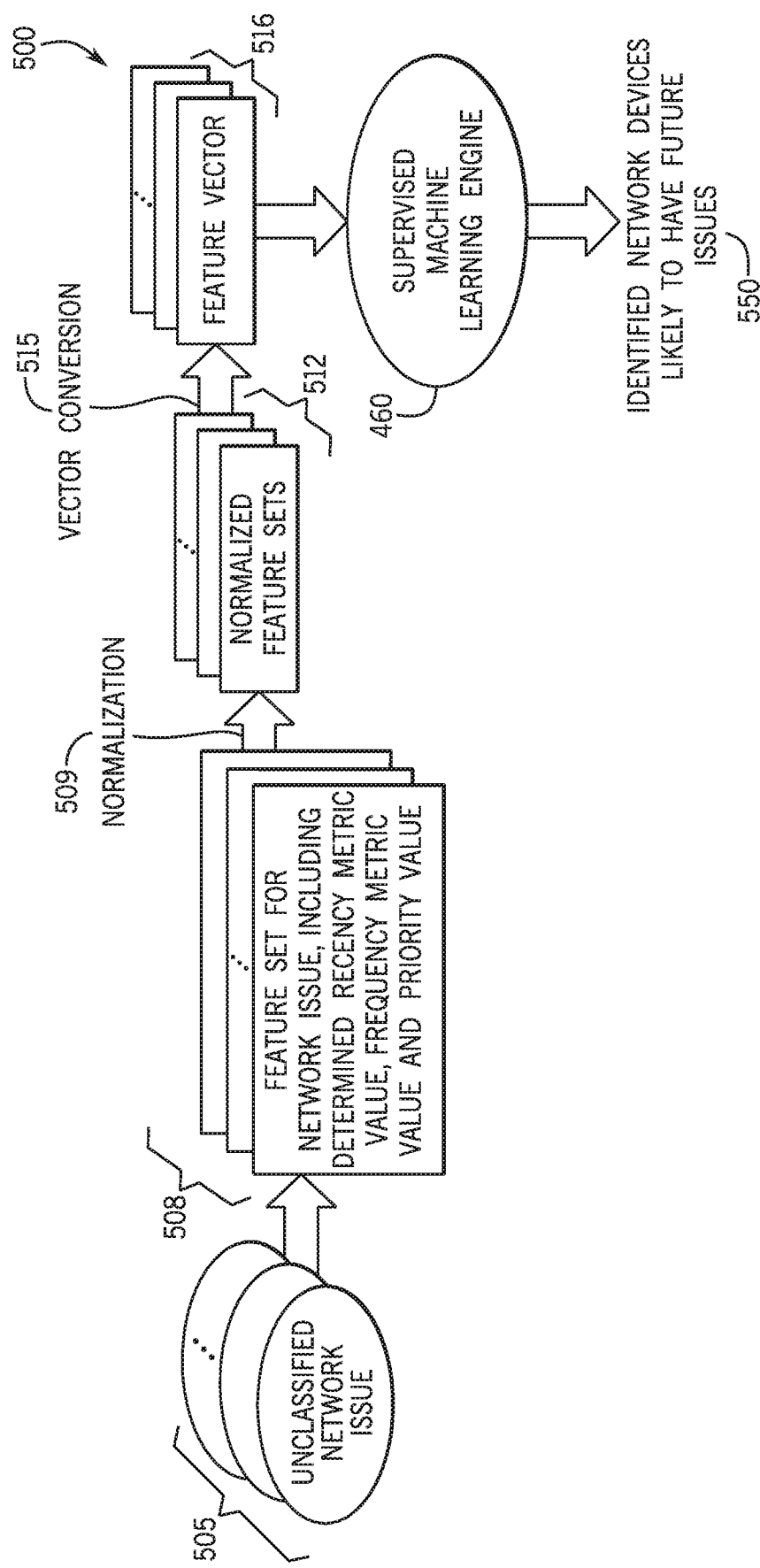
FIG. 5 is an illustration of a process to use the supervised machine learning engine of FIG. 4 to identify network devices likely to have future issues according to an example implementation.

Referring to FIG. 5 in conjunction with FIG. 1, in accordance with example implementations, the network issue prioritization engine 120 may use the trained supervised machine learning engine 460 as illustrated in a process 500. The network issue prioritization engine 120 decomposes unclassified network issues 505 (i.e., here, issues 505 for which a determination has not been made whether the issues associated with future problems for the associated network devices 180) into corresponding feature sets 508. The network issue prioritization engine 120 normalizes 509 the features sets 508 to produce normalized feature sets 512 and converts 515 the normalized featured sets 512 into corresponding feature vectors 516. Based on the feature vectors 516, the supervised machine learning engine 460 generates data representing network devices that are likely to have future issues, as depicted at 550. Depending on option input that is supplied by the analyst 117 to the GUI 116, the GUI 116 may display all of the identified network devices that the supervised machine learning engine 460 predicts are likely to have future network issues, just the critical network devices that are predicted to have future network issues, and so forth.

Figure 6:
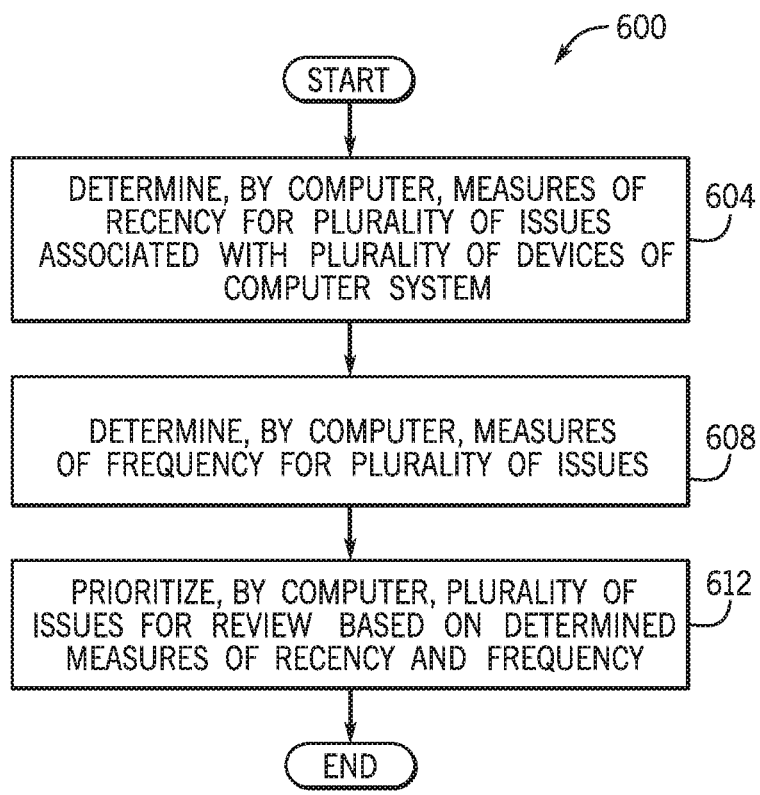
FIG. 6 is a flow diagram depicting a technique to prioritize issues associated with devices of a computer system according to an example implementation.

Referring to FIG. 6, thus, in accordance with example implementations, a technique 600 includes determining (block 604), by a computer, measures of recency for a plurality of issues that are associated with a plurality of devices of a computer system; and determining (block 608), by the computer, measures of frequency for the plurality of issues. The technique 600 includes prioritizing (block 612), by the computer, the plurality of issues for review based on the determined measures of recency and frequency.

Figure 7:
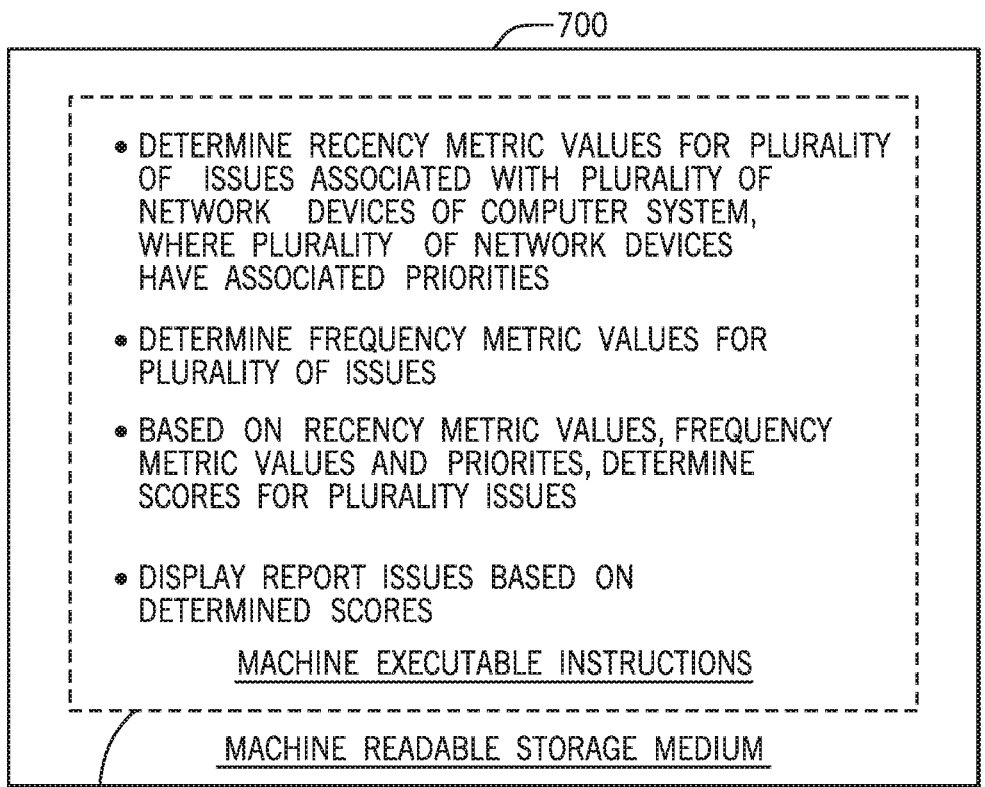
FIG. 7 is an illustration of machine executable instructions stored on a non-transitory machine readable storage medium to cause a machine to prioritize and display issues associated with the network devices according to an example implementation.

Referring to FIG. 7, in accordance with example implementations, a non-transitory machine readable storage medium 700 stores machine readable instructions 718 that, when executed by a machine, cause the machine to determine recency metrics for a plurality of issues that are associated with a plurality of network devices of a computer system. The plurality of network devices have associated priorities. The instructions 718, when executed by the machine, further cause the machine to determine frequency metrics for the plurality of issues; based on the recency metrics, the frequency metrics and the priorities, determine scores for the plurality of issues; and display a report of the issues based on the determined scores.

Figure 8:
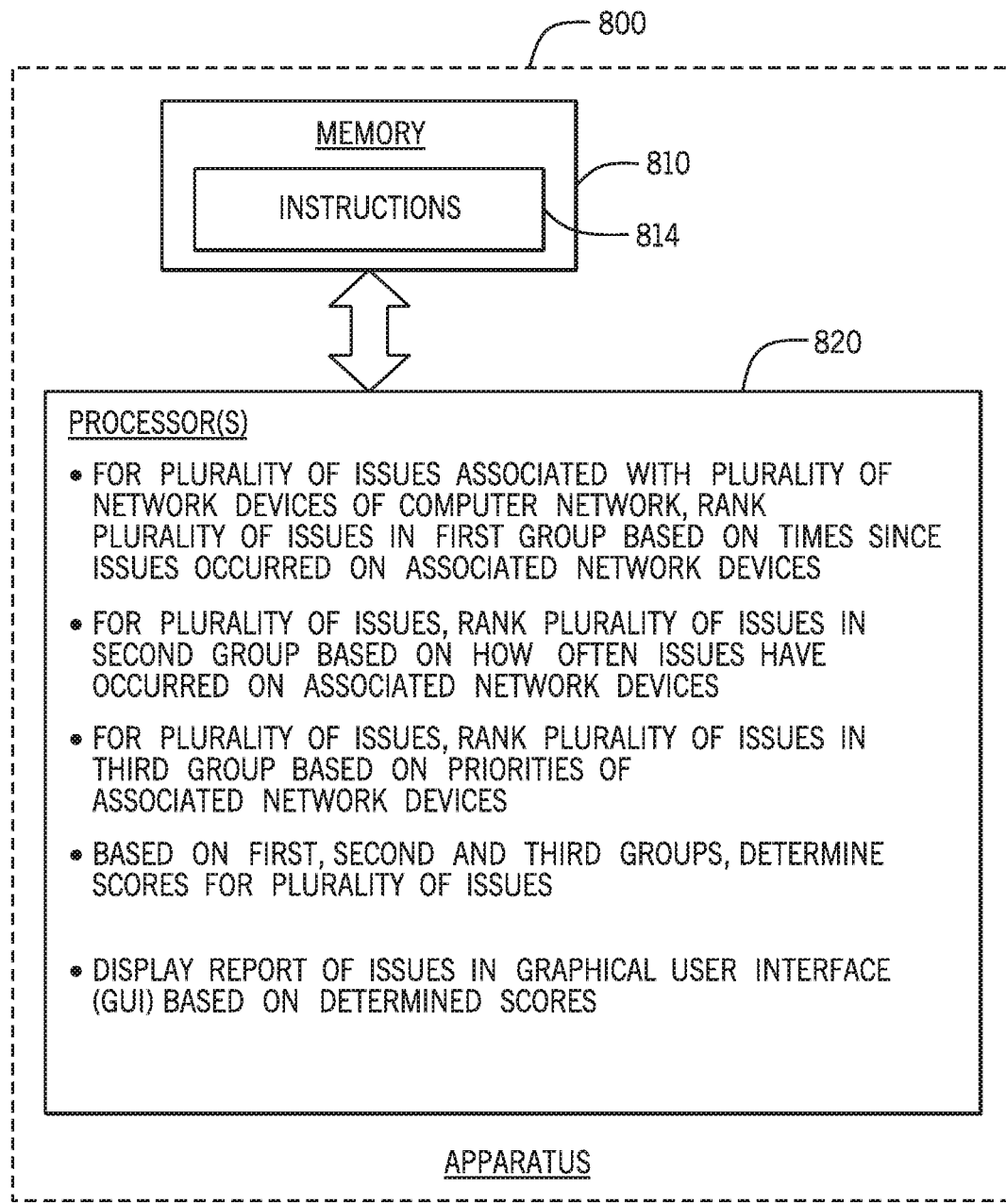
FIG. 8 is an illustration of an apparatus to determine scores for issues associated with network devices and display the issues in a GUI on scores based on the scores according to an example implementation.

Referring to FIG. 8, in accordance with example implementations, an apparatus 800 includes at least one processor 820 and a memory 810 that stores instructions 814 that, when executed by the processor(s) 820, cause the processor (s) 820 to, for a plurality of issues that are associated with a plurality of network devices of a computer network, rank the plurality of issues in a first group based on time since the issues occurred on the associated network devices. The instructions 814, when executed by the processor(s) 820, further cause the processor to, for the plurality of issues, rank the plurality of issues in a second group based on how often the issues have occurred on the associated network devices; and, for the plurality of issues, rank the plurality of issues in a third group based on priorities of the associated network devices. The instructions 814, when executed by the processor(s) 820, further cause the processor to, based on the first, second and third groups, determine scores for the plurality of issues; and display a report of issues of the plurality of issues in a graphical user interface (GUI) based on the determined scores.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
   monitoring a network for a plurality of network issues, wherein the plurality of network issues comprise hardware and software issues;
   determining, by a computer, recency measures for the plurality of network issues associated with a plurality of devices of a computer system, wherein each recency measure for a particular network issue associated with a particular device is determined based on a time duration that has elapsed since the particular device previously presented the same particular network issue, wherein a recency measure for each network device is calculated based on a time unit, and wherein the time unit is selected based on a device priority associated with each network device;
   determining, by the computer, frequency measures for the plurality of network issues, wherein a frequency measure for each network issue associated with a device is determined based on a total number of times the device experiences the network issue during a predetermined time period, wherein the predetermined time period is determined based on a criticality of an associated network device and/or a criticality of a business function that is affiliated or supported by the associated network device;
   determining, by the computer, a priority level of high, medium, or low for each network issue of the plurality of network issues based on a combination of an associated recency measure and an associated frequency measure for each network issue;
   initiating, by the computer, corrective actions for the plurality of network issues based on the priority level associated with each network issue; and
   generating, for display, a report of the plurality of network issues that indicates the priority level associated with each network issue.

2. The method of claim 1, further comprising:
   prioritizing the plurality of network issues based on the recency measures and the frequency measures.

3. The method of claim 1, wherein generating, for display, the report includes:
   generating, for display on a graphical user interface (GUI) of the computer, an output representing network issues of the plurality of network issues having higher priorities relative to other network issues of the plurality of network issues.

4. The method of claim 2, wherein the prioritizing further comprises:
   associating the plurality of network issues with a first group based on the recency measures;
   ranking the plurality of network issues of the first group based on the recency measures;

associating the plurality of network issues with a second group based on the frequency measures;
ranking the plurality of network issues of the second group based on the frequency measures; and
prioritizing the plurality of network issues for review based on the ranking of the first group and the ranking of the second group.

5. The method of claim 1, further comprising:
assigning priority values to each network issue of the plurality of network issues based on priorities of a plurality of devices associated with the plurality of network issues;
ranking the plurality of network issues based on the priority values assigned to each network issue of the plurality of network issues to generate a priority ranking value for each network issue; and
determining the priority level for each network issue of the plurality of network issues based on a combination of the associated recency measure, the associated frequency measure, and an associated priority ranking value of each network issue.

6. The method of claim 1, further comprising:
associating colors with the plurality of network issues based on an associated priority level for each network issue of the plurality of network issues, wherein each color corresponds to a particular priority level; and
generating, for display on a graphical user interface (GUI) of the computer, colored icons representing the plurality of network issues, wherein the colors of the colored icons correspond to the priority level for each network issue of the plurality of network issues.

7. The method of claim 1, further comprising:
causing a political map to be displayed on a graphical user interface (GUI) of the computer; and
causing icons to be displayed on the political map at geographical locations, wherein each icon to be displayed at a particular geographical location represents a set of network issues that occurred at the particular geographical location.

8. The method of claim 4, wherein the prioritizing further comprises:
assigning weights to the first and second groups; and
prioritizing the plurality of network issues based on the assigned weights.

9. The method of claim 6, further comprising:
causing a display of a color bar having the colors associated with the plurality of network issues; and
in response to receiving a user input that selects a color in the color bar, generating another report of a subset of network issues that have a priority level corresponding to the selected color.

10. The method of claim 7, further comprising:
for a given icon of the icons, selecting a size for the given icon to be displayed at the particular geographical location on the political map based on a total number of issues that occurred at the particular geographical location.

11. A non-transitory computer readable storage medium to store machine readable instructions that, when executed by a machine, cause the machine to:
monitor a network for a plurality of network issues, wherein the plurality of network issues comprise hardware and software issues;
determine recency metrics for the plurality of network issues associated with a plurality of network devices of a computer system, wherein a recency metric for a particular network issue associated with a particular network device is determined based on a time duration that has elapsed since the particular network device previously presented the same particular network issue;
determine frequency metrics for the plurality of network issues, wherein a frequency metric for each network issue associated with a network device is determined based on a total number of times the network device experiences the network issue during a predetermined time period, wherein the predetermined time period is determined based on a criticality of an associated network device and/or a criticality of a business function that is affiliated or supported by the associated network device;
determine a priority level of high, medium, or low for each network issue of the plurality of network issues, wherein the priority level for each network issue is determined based on a combination of an associated recency metric and an associated frequency metric for each network issue;
initiate corrective actions for the plurality of network issues based on the priority level associated with each network issue; and
generate, for display, a report of the plurality of network issues that indicates the priority level associated with each network issue.

12. The non-transitory computer readable storage medium of claim 11, wherein the machine readable instructions, when executed by the machine, further cause the machine to:
associate colors with the plurality of network issues based on priority levels of the plurality of network issues, wherein each color corresponds to a particular priority level; and
generate, for display on a graphical user interface (GUI) of the machine, colored icons representing the plurality of network issues, wherein the colors of the colored icons are based on the priority levels of the plurality of network issues.

13. The non-transitory computer readable storage medium of claim 11, wherein the machine readable instructions, when executed by the machine, further cause the machine to:
cause a political map to be displayed on a graphical user interface (GUI) of the machine; and
cause icons to be displayed on the political map at geographical locations, wherein each icon to be displayed at a particular geographical location represents a set of network issues that occurred at the particular geographical location.

14. The non-transitory computer readable storage medium of claim 11, wherein the machine readable instructions, when executed by the machine, further cause the machine to:
assign priority values to the plurality of network issues based on priorities of a plurality of network devices associated with the plurality of network issues; and
determine the priority level for each network issue of the plurality of network issues based on a combination of the associated recency metric, the associated frequency metric, and an associated priority value of each network issue.

15. The non-transitory computer readable storage medium of claim 13, wherein the machine readable instructions, when executed by the machine, further cause the machine to:
for a given icon of the icons, select a size for the given icon to be displayed at the particular geographical location on the political map based on a total number of issues that occurred at the particular geographical location.

16. The non-transitory computer readable storage medium of claim 15, wherein the machine readable instructions, when executed by the machine, further cause the machine to:
in response to a user input that selects an icon of the icons displayed on the political map, generate another report of a set of network issues that were classified in a priority class of a plurality of priority classes corresponding to the selected icon.

17. An apparatus comprising:
at least one processor; and
a memory to store instructions that, when executed by the at least one processor, cause the at least one processor to:
monitor a network for a plurality of network issues, wherein the plurality of network issues comprise hardware and software issues;
determine recency metrics for the plurality of network issues associated with a plurality of network devices of a computer system, wherein a recency metric for a particular network issue associated with a particular network device is determined based on a number of time units that have elapsed since the particular network device previously presented the same particular network issue, and wherein the time unit is selected based on a device priority associated with each network device;
determine frequency metrics for the plurality of network issues, wherein a frequency metric for each network issue associated with a network device is determined based on a total number of times the network device experiences the network issue during a predetermined time period, and wherein the predetermined time period is determined based on a criticality of an associated network device and/or a criticality of a business function that is affiliated or supported by the associated network device;
determine a priority level of high, medium, or low for each network issue of the plurality of network issues, wherein the priority level for each network issue is determined based on a combination of an associated recency metric and an associated frequency metric of each network issue;
initiate corrective actions for the plurality of network issues based on the priority level associated with each network issue; and
generate, for display, a report of the plurality of network issues that indicates the priority level associated with each network issue.

18. The apparatus of claim 17, wherein the instructions further cause the at least one processor to:
assign priority values to the plurality of network issues based on priorities of each of the plurality of network devices associated with the plurality of network issues; and
determine the priority level for each network issue of the plurality of network issues based on a combination of the associated recency metric, the associated frequency metric, and an associated priority value of each network issue.

19. The apparatus of claim 17, wherein the plurality of network issues comprises network issues attributable to security threats associated with a set of network devices of the plurality of network devices.

20. The apparatus of claim 17, wherein the instructions, when executed by the at least one processor, further cause the at least one processor to:
train a machine learning engine using the recency metrics and frequency metrics; and
apply the machine learning engine to detect a given network device of the plurality of network devices may have a network issue in the future.

* * * * *